Sept. 15, 1936.  J. W. WHITFIELD ET AL  2,054,577
FILTER
Filed April 26, 1935  3 Sheets-Sheet 1

INVENTORS.
J. W. Whitfield
J. D. Whitfield
H. Chapman
by Lowden O'Brien
atty.

Sept. 15, 1936.  J. W. WHITFIELD ET AL  2,054,577
FILTER
Filed April 26, 1935    3 Sheets-Sheet 2

INVENTORS
J. W. Whitfield,
J. D. Whitfield,
H. Chapman.
by J. Owden O'Brien
atty

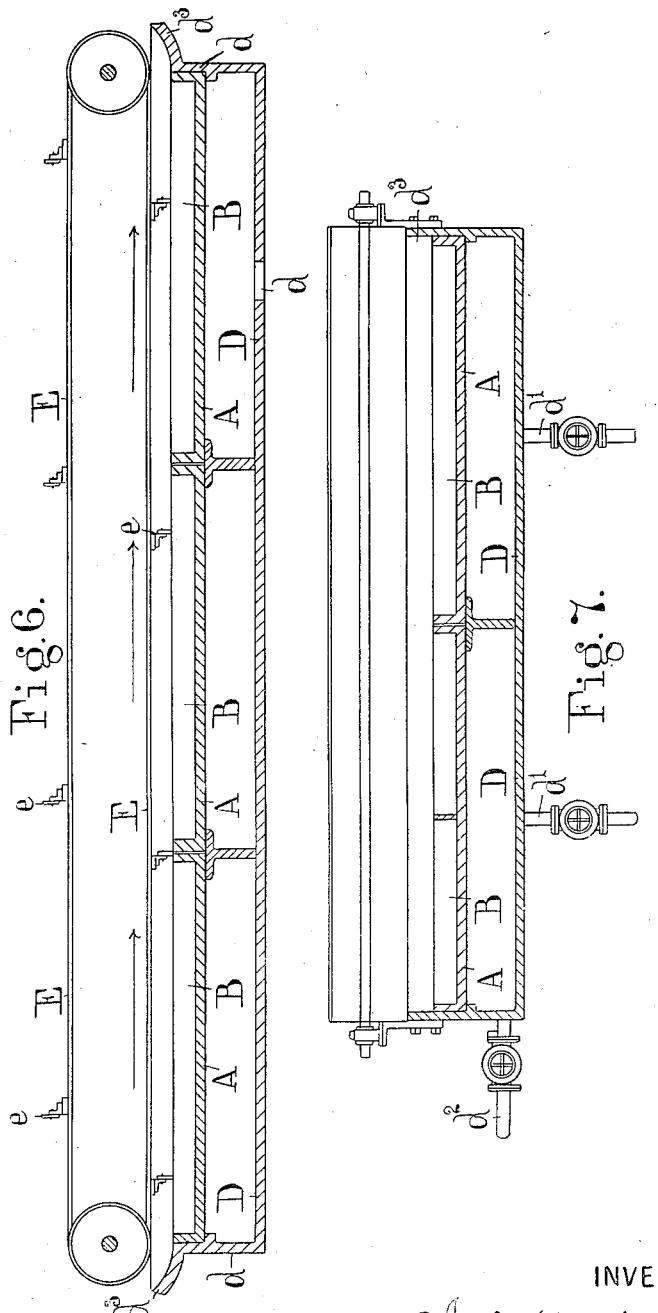

Patented Sept. 15, 1936

2,054,577

UNITED STATES PATENT OFFICE 2,054,577

FILTER

John William Whitfield, Thomas Down Whitfield, and Howard Chapman, Cadishead, England Application April 26, 1935, Serial No. 18,358
In Great Britain October 2, 1934

5 Claims. (Cl. 210—169)

This invention relates to an improved filter for the removal of colloidal and suspended solid matter contained in liquids, it being particularly applicable for dehydration of sewage sludges and various trade wastes and for the filtration of water.

Many filters and straining apparatus have been made or proposed in which the liquid is either forced by pressure or drawn by suction through narrow passages or apertures in some cases filled with a permeable material but the present invention differs from all such previous arrangements in that it does not make use of pressure, suction nor weight of the substance being filtered to cause the passage thereof through the filter but it makes use of the phenomenon that a smooth polished surface tends to repel any colloidal matter contained in a liquid thereby allowing a layer of colloid free liquid to form adjacent to the surface and it further employs capillary action without pressure or suction, to remove the separated liquid from between the smooth surface and the colloidal matter.

The filter according to the present invention comprises a tray or frame carrying a series of narrow straight flat strips or plates of rigid material arranged parallel to one another each having a polished or smooth surface, said strips or plates being supported on their lower edges and disposed side by side with a capillary space between each strip and the next filled with felt or similar material which will in co-operation with the smooth or polished sides of the strips have a capillary action on the liquid being filtered, and having their smooth top edges all lying in the same horizontal plane whereby these smooth top edges acting in conjunction with each other tend to repel the colloidal matter in the liquid leaving a layer of colloid-free liquid adjacent to the top edges of the strips or plates which is withdrawn therefrom by the capillary action of the sides of the strips or plates.

The narrow strips are constructed of any suitable rigid material which can be formed with a smooth or polished surface and which will not be acted upon by the liquid being filtered. For general use glass is found to be the most suitable material although glazed earthenware, polished ebonite, enamelled metal, anti-corrosive metal, or plain metal such as brass may also be employed, the choice of material used depending on the nature of the liquid being treated.

The preferred material for insertion in the spaces between the narrow strips of rigid material where such is employed, is a wool felt, although for some purposes a cotton felt or other material of a like nature may be employed.

Any number of filter trays or frames may be assembled together to form a complete filtering unit, the number of such trays or frames used depending on the dimensions of the individual trays or frames and the volume of liquid to be treated.

The invention will be described with reference to the accompanying drawings in which:—

Fig. 6 is a section on line 6—6 Fig. 5.

Fig. 7 is a section on line 7—7 Fig. 5.

Figure 4:
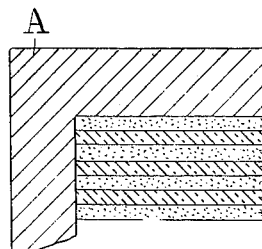
Fig. 4 is a section on a larger scale of a portion of the filter showing the felt insertion between the glass strips.

In the form of the invention illustrated in the drawings, each single filter tray comprises a frame A having a base $a$ formed with a large number of holes $a^1$ and unperforated sides and ends $a^2$, the frame being formed of metal or other suitable rigid material. A large number of thin sheet glass strips B placed on edge are carried in the frame A being supported by the base $a$ thereof. The strips B are arranged in parallel formation and are either arranged with a capillary space between them or with a narrow space between them filled with a strip of felt C (preferably woolen felt), see Fig. 4, which will co-operate with the vertical faces of adjacent strips B to effect a capillary action on the liquid being filtered.

Figure 1:
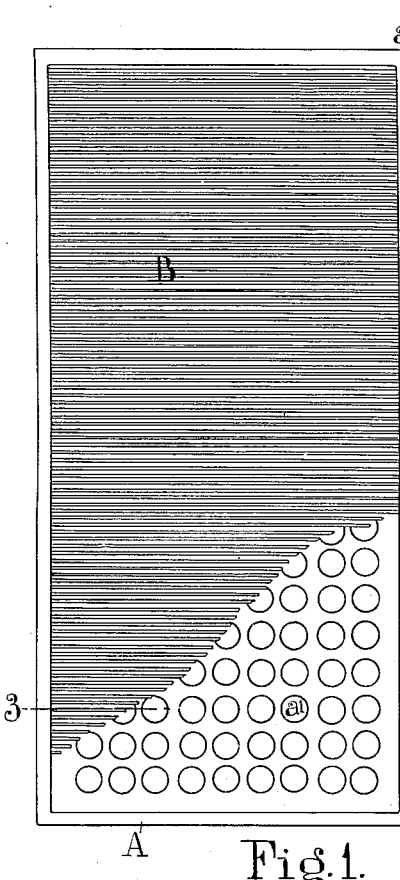
Fig. 1 is a plan view of a single filter tray or frame with part of the glass strips broken away to show the construction of the bottom of the tray.
Figure 2:
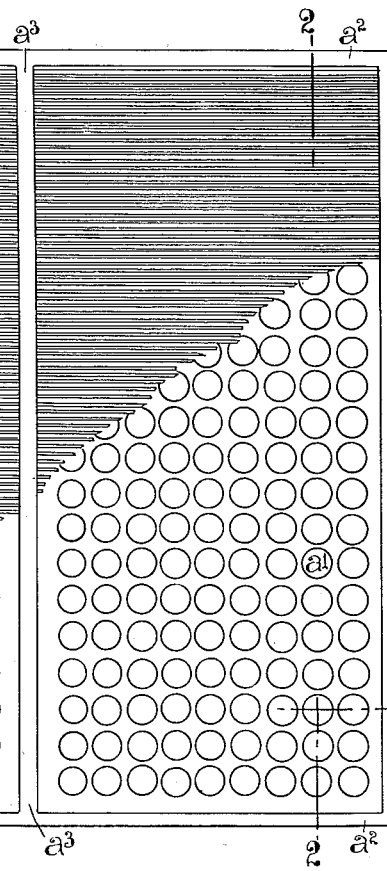
Fig. 2 is a section on line 2—2 Fig. 1.
Figure 2:
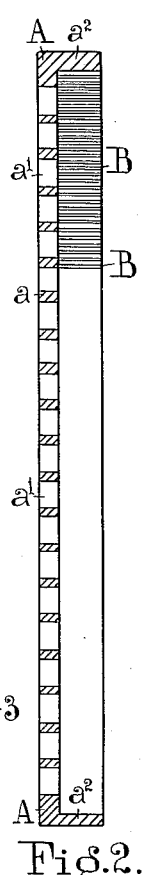
Figure 3:
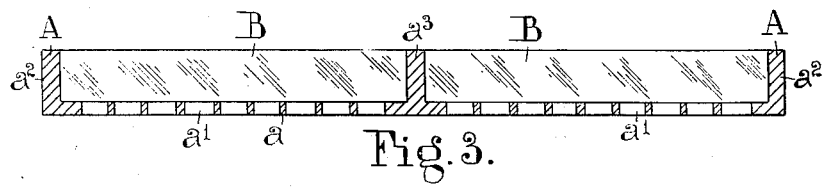
Fig. 3 is a section on line 3—3 Fig. 1.

The strips B may be arranged in the frame A as a single series but they are preferably arranged in two series separated by a division plate or rib $a^3$ as shown in Figs. 1 and 3.

The strips B are a tight fit in the frame A so that they will maintain their position therein, or grooves may be formed in the sides of the frame to receive the vertical edges of the strips.

It is essential in building up the glass strips B into the frame A that the top edges of the strips B should be smooth and all lie in the same horizontal plane in order that they may have a repelling action on the colloidal matter contained in the liquid.

Figure 5:
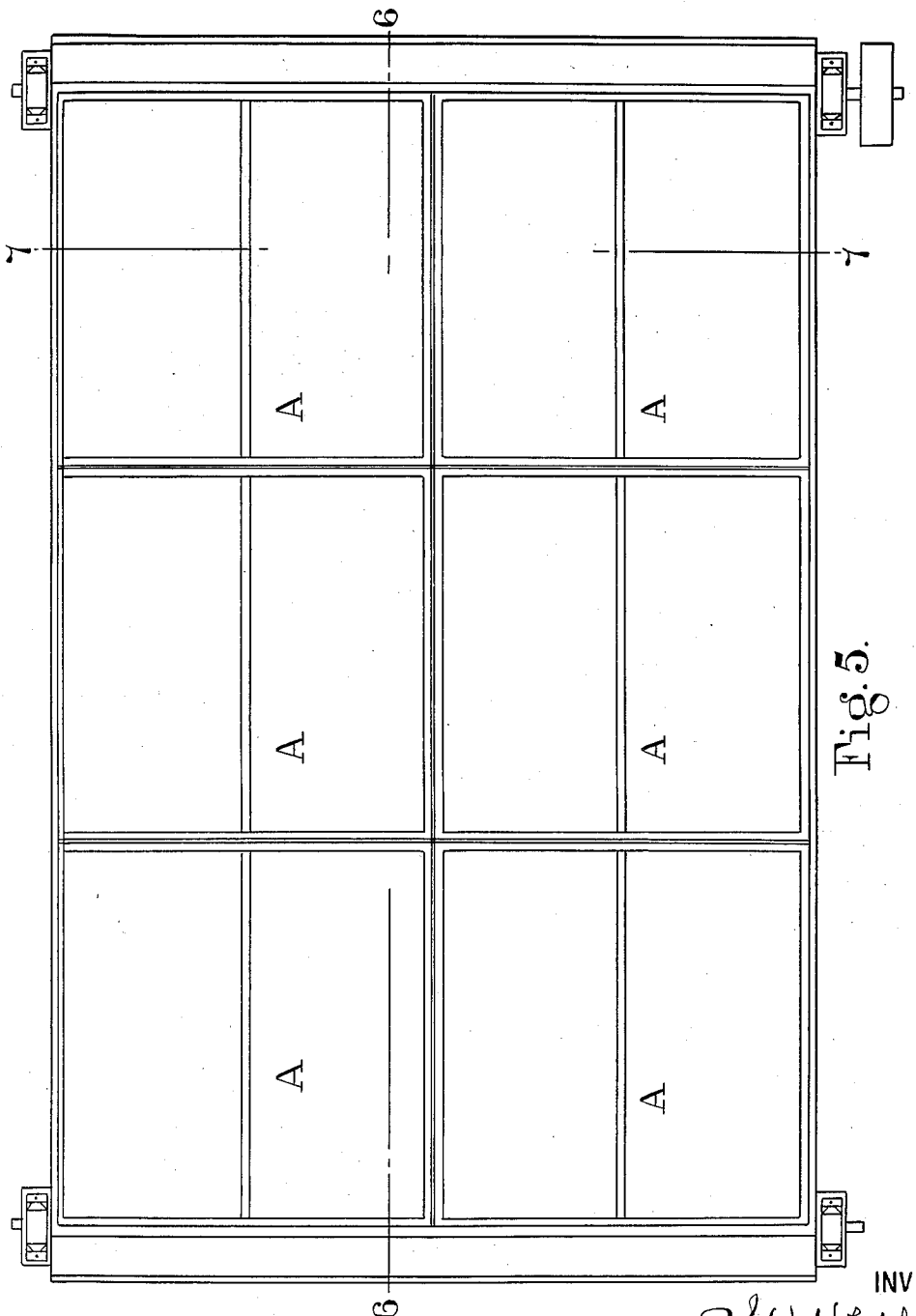
Fig. 5 is a plan view of a filtering unit built up of six of the single filter trays or frames shown in Fig. 1.

The complete filtering unit may be built up of any desired number of separate filter trays A according to the volume of liquid to be treated and Figs. 5, 6, and 7 of the drawings show a unit formed from six separate filter trays. The trays A are assembled over a filtrate collecting chamber D formed with flanges $d$ to support the trays and provided with outlets $d^1$ for the filtrate. The chamber D is also provided with a connection $d^2$ so that by closing the outlets $d^1$ fresh water can be supplied through the connection for flushing out the capillary spaces to maintain the filter in an efficient condition.

A travelling scraper band E provided with rubber scraper $e$ is arranged above the top surface of the filter trays for removing colloidal matter collecting thereon. The traveling scraper E may be continuously or intermittently driven.

In operation the liquid to be filtered is supplied to the space above the top edge of the filter trays formed by the curved flange $d^3$ of the filtrate collecting chamber D and owing to the force of adhesion exerted by the edge surface of the glass strips on the water or other liquid contained in material being treated resulting in the repulsion of the colloidal matter and the capillary action of the spaces between the strips, the water or other liquid is drawn down into the filtrate collecting chamber leaving the colloidal matter and cohesive solids on the surface from which they are removed by the travelling scraper. Any minute particles of solids of a non-colloidal nature which might pass down with the water between the strips collect in the felt (where such is employed) and are removed by periodic flushing.

What we claim as our invention and desire to protect by Letters Patent is:—

1. A filter for the removal of colloid and suspended solid matter contained in liquids comprising a horizontal tray having an apertured bottom, a series of plane, smooth, polished plates arranged on edge side by side within the tray, means for positioning the plates therein parallel to one another with a capillary space between each plate and the next, the said plates having plane, smooth, polished top edges lying in the same horizontal plane whereby each smooth top edge acting on conjunction with adjacent top edges tends to repel the colloidal matter in the liquid leaving a layer of colloid free liquid adjacent the top edges of the plates which flows down between adjacent plates due to the capillary action of their sides.

2. A filter for the removal of colloid and suspended solid matter contained in liquids comprising a horizontal tray having an apertured bottom, a series of plane smooth, polished glass plates arranged on edge side by side within the tray, means for positioning the plates therein parallel to one another with a narrow space between each plate and the next, the said plates having plane, smooth, polished top edges lying in the same horizontal plane whereby each smooth top edge acting in conjunction with adjacent top edges tends to repel the colloidal matter in the liquid leaving a layer of colloid free liquid adjacent the top edges of the plates which flows down between adjacent plates due to the capillary action of their sides.

3. A filter for the removal of colloid and suspended solid matter contained in liquids comprising a horizontal tray having an apertured bottom, a series of plane, smooth polished glass plates arranged on edge side by side within the tray, means for positioning the plates therein parallel to one another with a narrow space between each plate and the next and thin felt strips inserted between adjacent plates, the said plates having plane, smooth, polished top edges lying in the same horizontal plane whereby each smooth top edge acting in conjunction with adjacent top edges tends to repel the colloidal matter in the liquid leaving a layer of colloid free liquid adjacent the top edges of the plates which flows down between adjacent plates due to the capillary action of their sides.

4. A filter for the removal of colloid and suspended solid matter contained in liquids comprising a plurality of horizontal trays having apertured bottoms, a horizontal collecting chamber within which the trays are mounted, a series of plane smooth, polished glass plates arranged on edge side by side within the trays, means for positioning the plates therein parallel to one another with a capillary space between each plate and the next, the said plates having plane, smooth, polished top edges lying in the same horizontal plane whereby each smooth top edge acting in conjunction with adjacent top edges tends to repel the colloidal matter in the liquid leaving a layer of colloid free liquid adacent the top edges of the plates which flows down between adjacent plates due to the capillary action of their sides.

5. A filter for the removal of colloid and suspended solid matter contained in fluids as in claim 4 having a travelling scraper to remove the colloidal matter from the top edges of the filter plates.

J. W. WHITFIELD.
T. D. WHITFIELD.
H. CHAPMAN.